(No Model.)  2 Sheets—Sheet 1.

E. W. MARSH.
PROCESS OF CALCINING GYPSUM.

No. 343,181. Patented June 8, 1886.

WITNESSES:
Frederick Eibler
J. R. Barton.

INVENTOR
Edward W. Marsh.
BY H. J. Fisher.
ATTORNEY (No Model.) 2 Sheets—Sheet 2.

E. W. MARSH.
PROCESS OF CALCINING GYPSUM.

No. 343,181. Patented June 8, 1886.

WITNESSES:
Frederick Eibler
I. R. Barton.

INVENTOR
Edward W. Marsh,
BY H. J. Fisher.
ATTORNEY

UNITED STATES PATENT OFFICE.

EDWARD W. MARSH, OF BRIDGEPORT, CONNECTICUT, ASSIGNOR TO THE FORT DODGE GYPSUM-STUCCO COMPANY, OF FORT DODGE, IOWA.

PROCESS OF CALCINING GYPSUM.

SPECIFICATION forming part of Letters Patent No. 343,181, dated June 8, 1886.

Application filed January 18, 1886. Serial No. 188,866. (No model.)

*To all whom it may concern:*

Be it known that I, EDWARD W. MARSH, a citizen of the United States, residing at Bridgeport, in the county of Fairfield and State of Connecticut, have made certain new and useful Improvements in the Process of Calcining Gypsum; and I do hereby declare that the following is a full, clear, and exact description of the invention, which will enable others skilled in the art to which it relates to make and use the same.

Heretofore gypsum or plaster has been calcined by placing the material in a metallic vessel which was provided with flues extending upwardly from different points in its bottom or horizontally from different points in its sides, to heat the plaster in the body of the kettle. The kettle or vessel was heated by fire built beneath and about its bottom in the usual way. This process is liable to several serious objections. First, it is expensive, because the bottoms of the kettles are costly, and as they burn out rapidly require frequent replacing with new ones, occasioning much expense as well as loss of valuable time; secondly, the process is wasteful, owing to leaks through the bottoms, which frequently and unavoidably crack when the kettle is full of plaster and under a full head of fire, thus causing much loss of plaster as well as delay for repairs; thirdly, the process is generally unsatisfactory, for the reason that it is impossible to maintain uniformity of heat in successive boilings kettle after kettle, or in several kettles running at the same time, which results in giving a product differing in quality, according to the difference or irregularity of heat by which it is treated.

The object of my invention is to overcome these defects, to secure perfect uniformity in the application of heat, and in the quality of the product, as well as generally to improve the method of calcining gypsum.

The invention consists in employing steam to expel the volatile matter from gypsum and reduce it to a friable state, and in the construction and arrangement of mechanism by which this result is accomplished, as hereinafter fully described, and particularly pointed out in the claims.

Figures 1, 2:
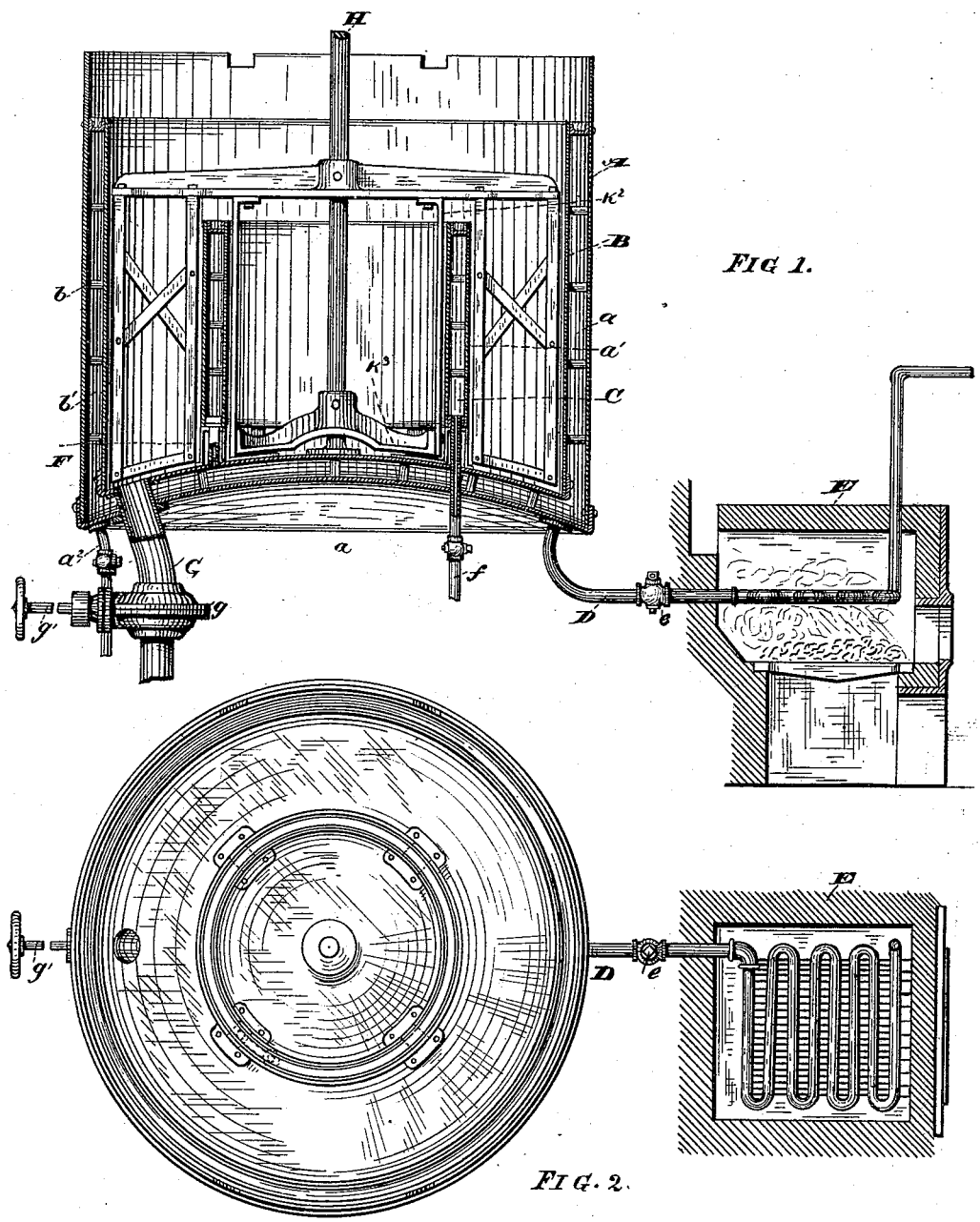
Figure 3:
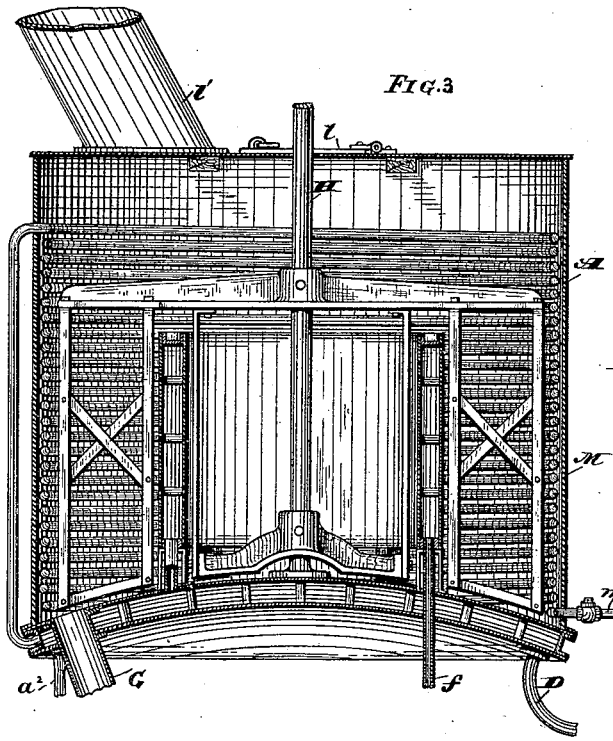
Figure 5:
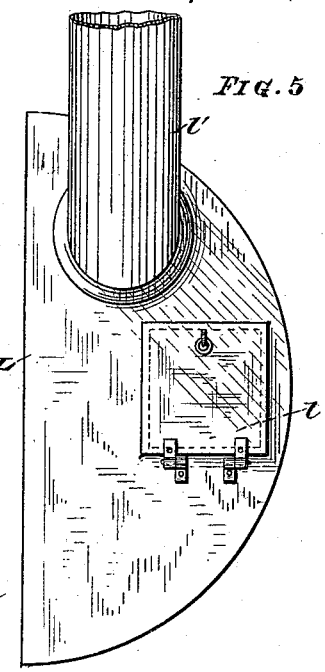
Figure 4:
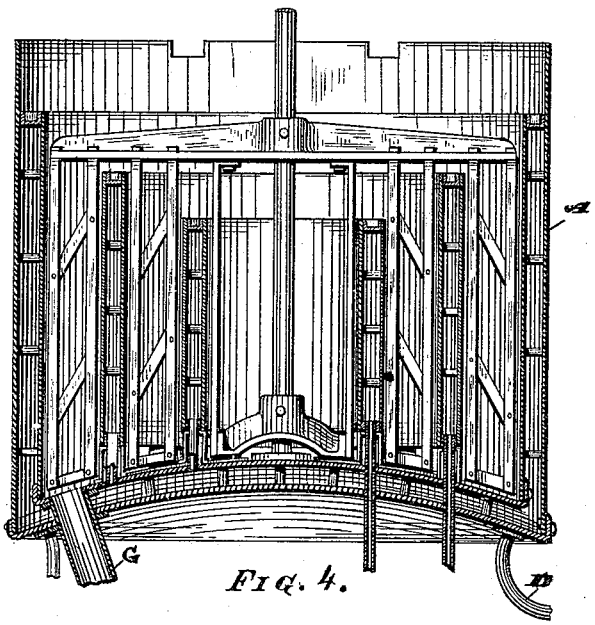
Figure 6:
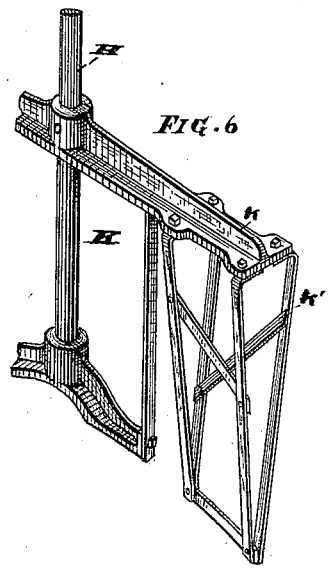

Referring to the drawings, Figure 1 is a vertical section of my preferred form of kettle with most of its attachments in full lines. Fig. 2 is a plan view of the same with the agitator removed. Fig. 3 is a vertical section of a modified form of kettle, showing coils of pipe instead of a steam-jacket about its inside. Fig. 4 is another form of kettle in which two inner jackets instead of one are shown. Fig. 5 is a plan view of a section of the cover, and Fig. 6 is a section of the agitator and shaft detached.

A represents the kettle, which may be of any desired size; but I prefer to make it six or seven feet high and about eight feet in diameter, and it is provided with a bottom, $a$, preferably concavo-convex in form, riveted to its sides. A continuous steam-jacket, $a'$, is formed in the bottom and sides of the kettle by a casing or cylinder, B, extending to a point near the top of the kettle and firmly secured thereto at intervals by bolts. Said casing also is provided with a bottom, $b$, fashioned to correspond to the outer bottom, $a$, and riveted to the casing B in like manner as said outer bottom.

C represents an inner jacket having about half the diameter and extending about two-thirds the height of the outer jacket. It is supported a short distance above the floor or bottom of the kettle by four flanged feet or standards, $c$, which are secured to the floor by screw-bolts.

D is a steam-pipe, the outer extremity of which may be connected to any ordinary boiler or other source of supply, and, passing through the furnace E, where it is lapped, as shown, or otherwise bent to expose the required extent of surface to the action of the heat, enters the jacket $a'$ at the bottom of the kettle. A cock or valve, $e$, in the pipe D serves to regulate the flow of steam to the kettle.

F is a short connecting-pipe having its ends turned in opposite directions, one end entering the inner jacket, C, immediately behind or within one of its standards, and the other end entering the bottom jacket at the side of the standard. A section of straight pipe would answer as well to establish communication between the jackets; but for convenience I prefer the form first described. An exhaust or drip pipe, $f$, extends from the jacket C through the bottom of the kettle, and the jacket $a'$ likewise is provided with a drip-pipe, $a^2$, entering the bottom of the kettle near its outer edge. Both pipes are furnished with suitable cocks to control their action.

G is a discharge-pipe, which extends through the jacket $a'$ to the interior of the kettle, and is provided with a valve, $g$, having a rod, $g'$, and wheel-handle for opening and closing the valve. This rod should be made of considerable length to avoid contact with the intense heat about the kettle.

H is a shaft having a bearing of any suitable form in the bottom of the kettle. To this shaft is secured an agitator, K, consisting of a cross-head, $k$, carrying hangers $k'$, the construction of which is clearly shown in Fig. 6, and hangers $k^2$, which are connected to a cross-bar, $k^3$, secured on the lower end of the shaft. The hangers $k'$ serve to agitate the gypsum in the space between the two jackets, and the hangers $k^2$, with the cross-bar $k^3$ moving over the bottom, serves a similar purpose within the inner jacket.

L, Figs. 3 and 5, represents a section of the top or cover of the kettle, which is provided with a door, $l$, through which the gypsum is introduced, and a flue or pipe, $l'$, for carrying off the vapor generated in the calcining process. Notches are formed in the top of the kettle, in which are placed wooden or metal bars to aid in supporting the cover.

From the foregoing description the operation of my device is apparent.

Referring to Fig. 1, the steam passing through the supply-pipe D is superheated by the furnace to any desired degree, the measure of which may be determined by a thermometer or other appliance, and entering the outer jacket in the bottom of the kettle is equally distributed by its own pressure to all parts of said jacket and to the interior of the inner jacket, C, through pipe F. By this means I obtain not only the amount of heat required to calcine the gypsum under treatment, but am enabled to control its quantity and degree, whereby uniformity of heating and of the quality of the product are easily and certainly obtained. It is proper to remark here that the gypsum is thoroughly ground before being placed in the kettle, and when sufficiently calcined is drawn off through discharge-pipe G.

In Fig. 3 I have shown a modification in which a coil of pipe, M, is arranged on the inside of the kettle instead of the side jacket, (shown in Fig. 1.) Said pipe, connecting with the bottom jacket at the side and coiling downward, has a discharge or drip, $m$, extending through the kettle near its bottom.

In Fig. 4 I show a modification which contains two instead of one inner jacket. If it should be found that the gypsum in the body of the kettle does not dry as rapidly as that which is more exposed about its sides, two or more interior jackets may be employed; but one is deemed sufficient for a kettle of the size I have mentioned. In other respects the construction of the modifications is the same as that shown in Fig. 1.

I do not consider it absolutely essential that the steam should be superheated, as fair results may be obtained by using steam directly from a boiler; but superheating improves its strength and quality and makes it thoroughly effective to do the work. Minor differences of construction may of course be made without departing from the spirit of my invention.

Having thus described my invention, what I claim as new, and desire to secure by Letters Patent, is—

1. The process of calcining gypsum herein described, which consists in subjecting the gypsum to steam-heat applied through a metallic surface, substantially as set forth.

2. The process of calcining gypsum which consists in placing the gypsum in a suitably-constructed kettle and exposing it to the heat of steam, as set forth.

3. The process of calcining gypsum consisting of placing pulverized or ground gypsum in a suitably-constructed kettle and exposing it to the heat of superheated steam, substantially as set forth.

4. The process of calcining gypsum which consists in subjecting the gysum to the heat of steam in a kettle or vessel in which the bottom and the side of the vessel to a point near its top is converted into a uniform heating-surface, substantially as set forth.

5. The process of calcining gypsum which consists in superheating steam and conveying it to a vessel or kettle filled with gypsum, and provided with a steam-jacket on its bottom and sides and an interior steam-jacket from which the steam is radiated, and agitating the gypsum to expose its particles equally to the heating-surfaces, as set forth.

6. A calcining-kettle provided with a steam-heating surface about its bottom and sides and a steam chamber or jacket to supply heat to the interior of the kettle, in combination with a steam-supply pipe, substantially as set forth.

7. A calcining-kettle having a steam-jacket about its bottom and sides and an interior steam-jacket, whereby an annular space is formed between said jackets, as set forth.

8. The combination of a kettle or vessel provided with a continuous steam-jacket on its bottom and sides with an interior steam-jacket of smaller diameter and a pipe to supply steam to said jackets, as set forth.

9. A calcining-kettle provided with a steam-heating surface about its bottom and sides and a steam-supply pipe, in combination with a furnace for superheating the steam, as set forth.

10. A calcining-kettle provided with a steam-heating surface about its bottom and sides and an interior heating-surface, in combination with an agitator constructed to rotate between the two heating-surfaces and within the interior surface, substantially as set forth.

11. A calcining - kettle provided with a steam-heating surface about its bottom and sides, in combination with an interior steam chamber or jacket supported above the bottom of the kettle on standards, whereby an open space is formed between said jacket and bottom, substantially as set forth.

12. The combination of a calcining-vessel having a concavo-convex bottom, a jacket extending over said bottom and around the sides of the kettle to a point near its top, an inside jacket about half the diameter of the kettle, and a pipe for supplying steam to said jackets, as set forth.

13. In a calcining-kettle provided with an outer jacket and an inner jacket and means for supplying superheated steam to said jackets, an agitator having hangers which move in the space between the jackets and within the inner jacket, and a discharge-pipe connected with the bottom of the kettle to draw off the plaster, as set forth.

14. A calcining-kettle provided with a steam-heating surface about its bottom and sides, an interior steam chamber or jacket supported above the bottom of the kettle on standards, a connecting-pipe between the jacket and the chamber in the bottom of the kettle, and a common discharge-pipe for the two subdivisions of the kettle, as set forth.

15. In a calcining-kettle provided with steam-jackets, a pipe for supplying steam to said jackets, a shaft carrying an agitator, a discharge-pipe for the kettle, and a cover having a door for the introduction of plaster, and a flue or pipe for carrying off the vapor, substantially as set forth.

EDWARD W. MARSH.

Witnesses:
F. W. MARSH,
H. D. KING.